United States Patent [19]
Bryant

[11] 3,983,966
[45] Oct. 5, 1976

[54] RECIPROCATING BRAKE

[76] Inventor: Clyde C. Bryant, 1920 Forrest Ave., East Point, Ga. 30344

[22] Filed: Sept. 4, 1974

[21] Appl. No.: 503,151

Related U.S. Application Data

[63] Continuation-in-part of Ser. No. 416,010, Oct. 15, 1973, Pat. No. 3,918,558, which is a continuation-in-part of Ser. No. 361,633, May 18, 1973, abandoned.

[52] U.S. Cl. .................. 188/2 R; 188/67; 188/294; 188/295
[51] Int. Cl.² .......................................... B60T 1/06
[58] Field of Search ............. 188/1 R, 2 R, 67, 290, 188/65.1, 295, 294; 74/60; 303/10, 61

[56] References Cited
UNITED STATES PATENTS

| 2,577,675 | 12/1951 | Berkland | 74/60 |
|---|---|---|---|
| 2,716,560 | 8/1955 | Clipfell | 188/67 |
| 3,200,906 | 8/1965 | Bernard | 188/65.1 |

FOREIGN PATENTS OR APPLICATIONS

| 722,664 | 7/1942 | Germany | 74/60 |
|---|---|---|---|
| 1,047,825 | 12/1958 | Germany | 188/2 R |
| 543,694 | 9/1922 | France | 188/295 |
| 905,840 | 12/1945 | France | 188/67 |
| 626,018 | 8/1927 | France | 188/295 |
| 371,069 | 4/1932 | United Kingdom | 74/60 |

Primary Examiner—Stephen G. Kunin
Assistant Examiner—Edward R. Kazenske
Attorney, Agent, or Firm—Gipple & Hale

[57] ABSTRACT

A brake system comprising in combination a swash plate mounted on a rotating member such as an axle and a lever system connected to the swash plate and adapted to be driven by the swash plate. A caliper holding a piston is positioned adjacent one of the levers in the lever system so that the piston can selectively frictionally engage the one lever of the lever system to hold the lever in a fixed position thereby stopping the rotary member from rotating.

9 Claims, 9 Drawing Figures

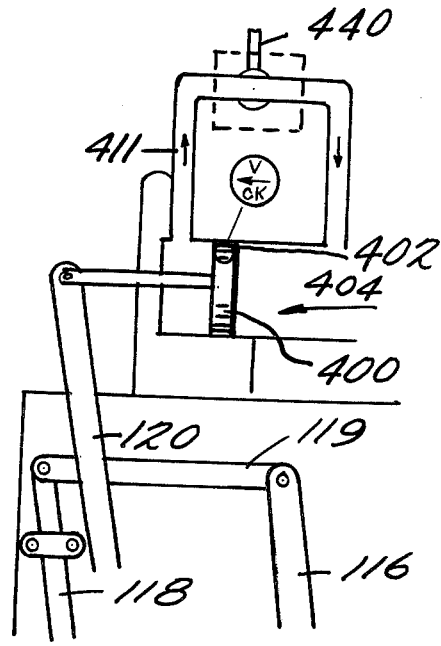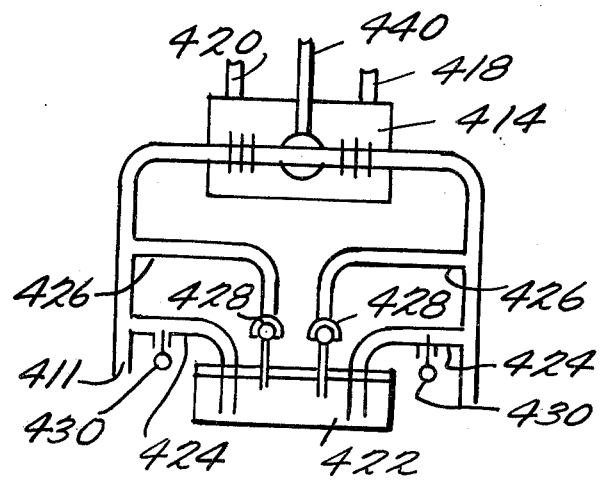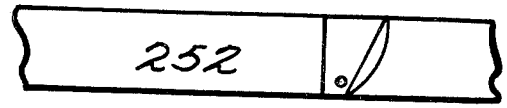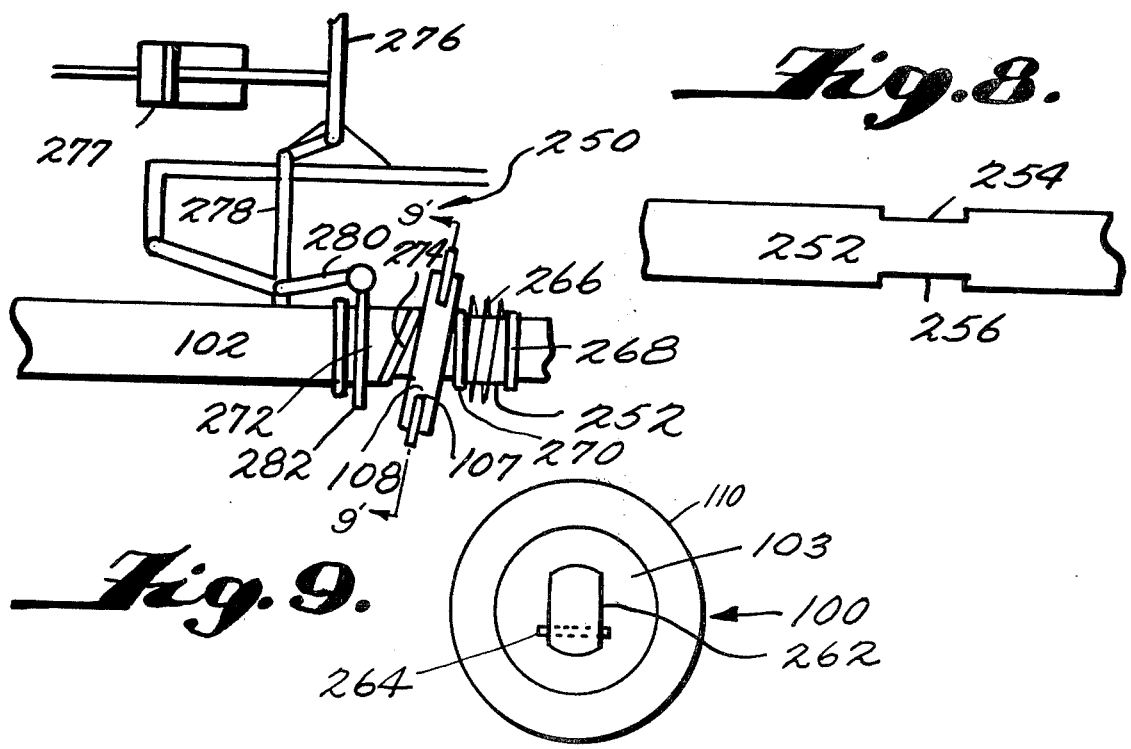

RECIPROCATING BRAKE

This is a continuation-in-part of my copending application Ser. No. 416,010, filed Oct. 15, 1973 now U.S. Pat. No. 3,918,558, which is a continuation-in-part of application Ser. No. 361,633, filed, May 18, 1973 now abandoned.

BACKGROUND OF THE INVENTION

The present invention generally relates to a mechanically advantaged friction brake and more specifically applies to a fluid, air or mechanically activated brake in which braking is accomplished through the use of a novel combination of an improved swash plate mechanism used with a compound lever system and a reciprocating friction bar.

The present invention can be easily adapted to be placed on presently operable automobiles, trucks, trains, airplanes, and other diverse mechanisms. With the invention's simple sturdy construction, it can inexpensively be adapted to any desired usage. The invention cuts maintenance costs because brake shoe and wheel wear is drastically reduced.

The invention is particularly useful in that it provides a safe, dependable brake which is cooler, thus removing the hazards of brake fade which currently exists with present commercial brakes. In the invention heat is reduced and removed to an area remote from the wheels and tires. When used in airplanes this would remove the hazard of overheating brakes.

In addition the torque delivered from the wheels to the friction brake bar is greatly divided by the compound lever torque converter. Thus if the ratio of load and effort arms of the lever system (including the swash plate) was 1 to 4, this would divide the torque delivered from the axle or wheels to the brake bar of the invention to 4 to the fourth power or 1/260. Also, if the last lever in the system has a 1 to 8 ratio this would divide the torque to 1/520. The friction bar and lever system acts as a heat sink. This coupled with the fact that much less heat will be developed makes the invention a cooler running brake.

An additional advantage of the invention is that much of the energy from the wheel is used up in the work of overcoming the inertia at the end of each reciprocating stroke. The brake can be operated very efficiently by levers and cables in case of failure of the hydraulic or air system.

DESCRIPTION OF THE PRIOR ART

In the past railway vehicles, fast moving heavy vehicles, drilling units, motors and other mechanisms have been stopped through the use of several kinds of brakes. All of these brakes have involved the use of a brake shoe or discs being applied to the wheel in the same manner. Initially the brake shoes were hand operated so that the braking force was applied to the wheel by a system of levers worked by a hand wheel mounted on screw spindle.

Several U.S. patents have used lever systems to transmit mechanical movement. U.S. Pat. No. 2,577,675 discloses a mechanical movement in which a swash plate is used to transmit oscillating movement through the use of levers to sleeves which are mounted on the drive shaft. U.S. patent Ser. No. 383,407 discloses a swash plate and lever assembly which translates oscillating movement for use in a valve. Another U.S. Pat. No. 1,326,689 discloses an engine having a swash plate which drives pistons and a lever system to activate a shifter member which leads to an activating means. Another lever usage is diclosed in U.S. Pat. No. 1,642,560, for a power hammer in which a lever system is attached to a swash plate so that rotation of the swash plate drives the lever mechanism which in turn reciprocates a driving rod of the jack hammer. A variable torque converter working from a wobble plate is disclosed in U.S. Pat. No. 2,243,928.

Other known brake systems involve the use of brake shoes or discs, all of which frictionally engage the wheel which is desired to be braked.

None of the known brake art uses a compound lever system in combination with a swash plate system to divide the torque delivered from the wheels to a point away from the wheels so that the braking heat is reduced and dispatched at an area remote from the wheels and tire.

SUMMARY OF THE INVENTION

The basic principle of the present brake invention is that the rotary motion of the axle is transformed into a reciprocal motion by a swash plate and the torque is divided through the use of a compound lever system with the reciprocal motion being reduced and stopped by a hydraulic cylinder-piston arrangement with its caliper, similar to the caliper-piston arrangement of a conventional disc brake. The brake can also be operated by an air system. In order to activate the brake the operator depresses the pedal to a conventional master hydraulic cylinder, or activates the air booster. The fluid or air expands the piston heads against the friction pads which engage the reciprocating friction bar driven by the compound lever system to slow the rotary motion of the axle until the axle ceases to move.

Other features and advantages of the invention will be apparent from the following description of the embodiments of the invention as shown in the accompanying drawings.

BRIEF DESCRIPTION OF THE DRAWINGS

FIG. 4 is an elevational view partially in cross section of an attachment that can be used with the invention;

FIG. 5 is a schematic presentation of the attachment shown in FIG. 4;

FIG. 6 is a side perspective view of a clutch mechanism which can be used with the invention;

FIG. 7 is a side view of the axle of the clutch mechanism shown in FIG. 6;

FIG. 8 is a top plan view of the axle shown in FIG. 7; and

FIG. 9 is an enlarged cross-section view taken along lines 9'—9' of FIG. 6.

DESCRIPTION OF PREFERRED EMBODIMENTS

Figure 1:
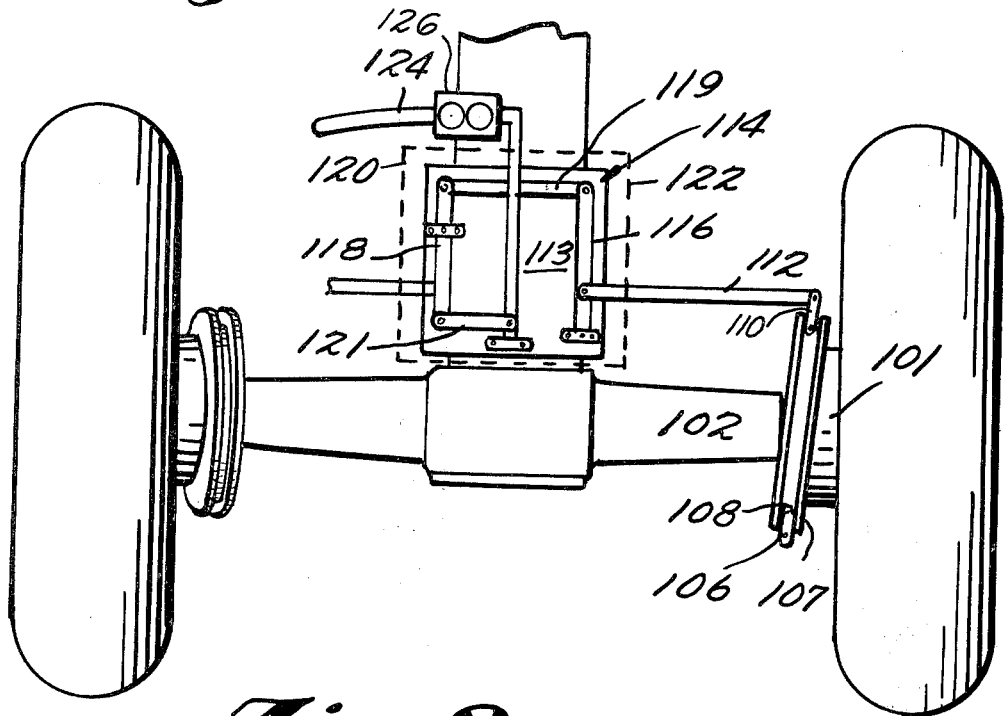
FIG. 1 is a front elevational view of the preferred embodiment of the brake invention.

In the preferred embodiment of the invention an improved swash plate 100 is keyed to a rotating axle and wheel set 101. It should be noted that the swash plate can be secured to an rotating axle or to a wheel rotating on the axle. The swash plate comprising an inner plate 103 and outer plate or ring member 110 is movably positioned on the axle 102 by a clutch mechanism 250 as shown in FIG. 6 from a non-engaging angle of 90° to the axle to any working desired obtuse angle. On the outer surface 106 of the inner plate riding within a groove 107 cut into the outer surface and over bearings 108 is a ring member 110 which does not rotate with the inner plate 103. The ring member 110 is a motion converter and only reciprocates as the wheel or axle rotates.

Fastened to the edge of the ring member 110 is a link 112 which in turn is connected to a lever 116 of a compound lever system 114. This compound lever system 114 primarily consists of a support plate 113 secured to the vehicle body, a class 3 lever 116 pivotally mounted to the support plate, a connecting link 119 connecting lever 116 with a class 1 lever 118 and a second connecting link 121 connecting lever 118 with a second class 3 lever 120. Levers 116, 118, and 120 are pivotally mounted to the support plate at the position of the lever which determines its work classification. It should be noted that the link arms and levers are preferably movably secured together by rivets. While a particular arrangement of levers is shown it is apparent that any grouping and number of classes of levers can be used to reduce the torque transmission.

It is further envisioned that the compound lever system 114 can be enclosed in a water or fluid filled crankcase, as schematically shown by the dotted line 122 of FIG. 1. Thus the movement of the levers in the water would cause the water to churn absorbing some of the energy and offering cooling for the system. The levers can optionally be made with fins to offer more surface to churn the water and use up more energy. Since the churning motion could build up heat and pressure in the crankcase the crankcase can be fitted with a pressure release safety valve in order to remove any excess heat as steam.

The swash plate 100 drives link 112 due to the wobbly motion of the swash plate. The swash plate 100 thus drives a reciprocating brake bar 124 which is secured to lever 120 by transferring its wobbling rotary motion through the lever system to the brake bar 124. The swash plate is connected to the drive shaft, axle or wheel along with the clutch mechanism 250 and turns with it. The outer ring member 110 does not rotate but only wobbles in a reciprocal motion when placed in an obtuse angle by the clutch.

The swash plate is mounted movably on the axle or drive shaft or wheel and is keyed to the axle or wheel so that it must rotate with it. This plate is fitted with a clutch which changes the angle of the swash plate from 90° to any obtuse angle at the will of the operator. When the plate is at a 90° angle to the axle it simply rotates. When the angle is changed the plate rotates and wobbles. A ring is mounted on the swash plate and fastened to a lever link of the compound lever system. The ring is kept from rotating by the lever link and its only motion is linear as the plate rotates. The clutch changes the angle of the swash plate from 90° to an obtuse angle and locks the swash plate into place.

In the clutch mechanism spring 266 rides on shaft 252 and has one end seated against a ring 268 secured on the shaft and the other end secured to a second ring 270, slidably mounted on the shaft and abutting against the swash plate keeping it vertical or at a 90° angle with the shaft during all times that the brakes are not on. On the other side from the swash plate is a slidable sleeve 272 having its leading end 274 cut at the obtuse angle needed for the swash plate operation.

When the brakes are applied a lever 276 is pulled manually or by other means such as an air booster or hydraulic cylinder 277. This lever has an arm which is mounted on a fixed pivot and is joined to a second lever 278 by another pivot. This lever has an arm 280 which is pivoted to slidable sleeve member 272 by means of a fork or yoke 282 which fits into a groove of a sliding member 272 allowing it to be slidably moved along the shaft 252. The elbow or mid-joint of the levers is forced in order to straighten out the links and press the swash plate against the angle groove in the shaft. When the swash plate is pressed against the angle groove the knee goes slightly past center and locks into position. The knee has top lugs to prevent it from going too far past center. The reciprocating action is then stopped by pressure exerted on its friction bar by its hydraulic pistons by a hydraulic master cylinder. To release the brake, the clutch is released and the pressure is removed from the master cylinder.

For a smoother stop and to overcome the dead-center problem two swash plate brake sets can be used set at 90° to each other as illustrated in FIG. 1. This use of a plurality of lever-brake assemblies would further decentralize the heat produced by the friction, and greatly reduce the overall size of the brake.

Another type of clutch can be placed on the reciprocating arm which connects the swash plate ring and first lever link. A clutch of this type is described and shown in FIGS. 12 and 14 of my copending U.S. patent application Ser. No. 361,633. It may be noted that both clutches are non-friction clutches.

Figure 3:
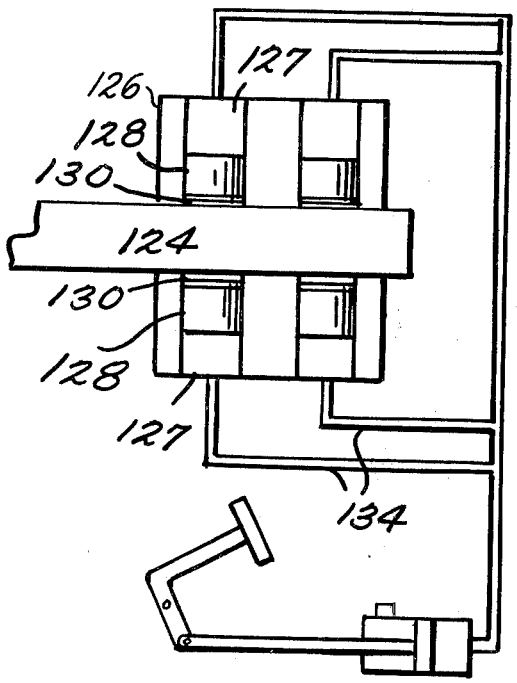
FIG. 3 is an enlarged cross-sectional view and schematic presentation of the caliper and piston assembly of FIG. 1.

The last lever arm 120 is integrally connected to a slightly arched friction brake bar 124 which extends at an approximate 90° angle to the lever. This friction brake bar 124 has a caliper 126 around it which holds two hydraulic cylinders 127 and associated pistons 128. Any desired number of cylinders and pistons can be held by the caliper but usually only two to four cylinders are utilized in the manner shown in FIG. 3. Between the pistons 128 and the friction bar 124 are friction pads 130 similar to the pads of a disc brake. Hydraulic pressure lines 134 connect the hydraulic brake cylinder to a hydraulic master cylinder 136 which is controlled by the operator. The friction bar, calipers and pads can be replaced by or used in conjunction with the fluid damper brake described in my two previously identified co-pending applications or as shown in FIGS. 4 and 5. The caliper and pistons can also be replaced by a cable and cam lever pressure friction system.

The previously described lever system and associated piston arrangement is preferably positioned on one side of the brake bar 124 with an identical system positioned on the other side of the brake bar. However, the system can be used with pistons only on one side with only friction pads on the opposite side and with the caliper "floating".

In the clutch an angle or drive shaft 252 is made with two large grooves 254 and 256 which act to key the swash plate 100 positively to the shaft. The swash plate 100 is machined with the center hole having two large bands 262 to fit the shaft grooves. A pin 264 as shown goes through the shaft and engages the plate at a point which allows the plate to change angles from 90° to an obtuse angle.

The swash plate can be used in any different manner. In one usage the swash plate is keyed to the axle and turns with it and would have a pin off center through the axle. In another way it can be keyed off center in a movable way to the wheel itself. Two bolts are provided through routed out holes on the side of the wheel and would allow the proper mobility. A spring 252 on the side away from the slidable clutch sleeve would keep the swash plate at a right angle and thus out of gear at all times the clutch is not engaged.

Figure 2:
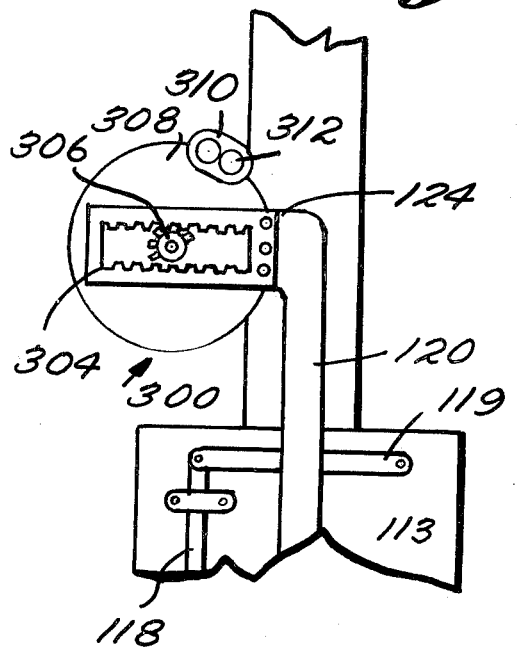
FIG. 2 is an enlarged front elevational view of an alternate embodiment of FIG. 1.

In another embodiment of the invention as shown in FIG. 2 a motion converting apparatus 300 is used for converting the reciprocating motion of the brake bar 124 into a rotary motion through the use of a double rack 304 and half pinion gear 306. The reciprocating movement of the rack 304 drives gear 306 and a disc 308, in a rotary manner. As the disc 308 rotates it passes through a holding caliper 310 forming hydraulic cylinders 312 so that the disc can be braked as previously described in the embodiment of FIG. 1. The motion of the rotary disc 308 is thus halted by the use of brake disc with the advantage being that this brake disc would be much lighter than that of the conventional disc brake and that heat is reduced and removed from the vicinity of the wheels and tires.

The braking disc 308 lightly engages the braking discs placed in the cylinders 312 so that when the pistons in the cylinders are activated by an appropriate servo mechanism the pistons are forced against the disc in much the same manner as a conventional hydraulic disc brake.

Another embodiment of the invention, as is shown in FIGS. 4 and 5, utilizes a piston 400 directly connected to lever 120 so that the piston is reciprocated by the lever system and swash plate. As the ring member 110 reciprocates it depresses and extends piston 400 in the cylinder 404. The cylinder or cylinders whose plurality of pistons are used are filled with hydraulic fluid. The piston 400 is preferably provided with a one-way valve 402 so that the fluid is pumped through the system in one direction. The hydraulic fluid used in the braking system can be oil, oil and water emulsion, ethylene glycol or other antifreeze compounds and water. In any situation in which weight and size is critical as for example in an aerospace application, the cooling system of the brake can be eliminated by the use of water as a hydraulic fluid. The rise in temperature in the brake caused by the braking action would add to its efficiency as it would create a greater back pressure on the damper piston. Also a smaller volume of liquid could be used since the brake could be operated to a much higher temperature, since temperatures as high as those occurring in steam engine boilers would be safe. A safety valve could be provided for steam to pop off or escape at a safe level of pressure if water-glycol was used in the system.

The hydraulic fluid is pumped from cylinder 404 through a hydraulic line 411 which can be enclosed in a cooling system or radiator 414. The radiator 414 can be supported with a steady flow of coolant through inlet 418 and discharged through outlet 420. The hydraulic line 411 is connected to a reservoir 422 by conduits 424 and 426. Conduits 426 are provided with a one-way valve 428 which allows fluid to flow from the reservoir into the hydraulic line at any time when the pressure in the reservoir is greater than that in the line. Conduit 424 is provided with a valve 430 which is pulled open at the beginning of the decompression stroke to release the slight compression of the fluid into the sealed reservoir which has an air layer. Valve 430 closes on the beginning of the compression stroke as the more compressive air relieves the pressure excited by the less compressible fluid. Another type of reservoir would be to have a simple fluid filled cylinder with a spring held piston keeping a slight pressure on the fluid system and separating the fluid from the open air. The valves 428 and 430 would open into the fluid filled end of the cylinder. To apply the brake a shut-off valve 440 is closed and thus lever 120 is locked into position stopping the connected wheel or axle.

Either of these designs can also be used on a train or truck which utilizes an air system in the following manner. The air from the reserve tank would activate an air booster which would tilt and lock the swash plate into operation position. Then the same air would blow through a valve which the piston of the first booster uncovers when fully activated. The air then would activate a second booster to apply the friction pads of FIGS. 1 and 2, or close the damper shut-off valve of FIG. 4, thus applying the brake.

While the preferred embodiment of the invention has been disclosed, it is understood that the invention is not limited to such an embodiment since it may be otherwise embodied in the scope of the appended claims.

What is claimed is:

1. A vehicle system comprising in combination a rotating member, a swash plate mounted on said rotating member, lever means connected to said swash plate and driven by said swash plate, said lever means comprising a support plate and a plurality of levers pivotally mounted on said support plate, caliper means mounted to said vehicle, said caliper means having piston means therein positioned adjacent said lever means, said piston means being slidable in said caliper means to selectively directionally engage said lever means and hold said lever means in a fixed position to stop said rotating member from rotating.

2. A brake system as claimed in claim 1 including a friction bar connected to one of said plurality of levers, said friction bar being adapted to be reciprocated by said plurality of levers.

3. A brake system as claimed in claim 2 wherein said caliper means being mounted adjacent said friction bar, said caliper means defining a plurality of hydraulic cylinders incorporating said piston means and fluid transport means connected to said hydraulic cylinders.

4. A brake system as claimed in claim 1 wherein said lever means is enclosed by a crankcase adapted to be filled with a fluid.

5. A brake system as claimed in claim 2 wherein said friction bar comprises a rack means, a half pinion gear rotatably mounted in said rack means, and a disc secured to said half pinion gear, said half pinion gear being adapted to be rotated by said rack means causing said disc to rotate.

6. A brake apparatus for a vehicle comprising a swash plate moveably mounted on the axle of said vehicle and keyed to said axle so that it rotates with it, an outer ring member mounted on said swash plate which wobbles in a reciprocal motion when said swash plate is orientated at an angle to said axle and rotated, a support plate mounted to said vehicle, a plurality of connected levers pivotally mounted on said support plate, one of said levers being connected to said swash plate to transmit movement of said swash plate to said plurality of levers, motion transfer means comprising a slightly arcuate linear bar connected to another of said levers, a caliper mounted to said vehicle, piston means slidably mounted in said caliper, said arcuate linear bar being driven by said swash plate through said plurality of levers adjacent said piston means, said piston means including a plurality of pistons communicating with a master cylinder, said master cylinder being optionally activated to actuate said pistons into frictional engagement with said arcuate linear bar to prevent movement of said arcuate linear bar through said caliper and retard rotation of said vehicle axle.

7. A brake apparatus for a vehicle comprising drive means, a swash plate mounted to said drive means to be driven by said drive means, lever means mounted to said vehicle, said lever means comprising a plurality of levers connected together and movably mounted on support means, one of said levers being connected to said swash plate, another of said levers being connected to a motion bar, the action of said swash plate on said levers being such as to reciprocate said motion bar, a caliper means mounted to said vehicle, said caliper means having piston means mounted adjacent said motion bar to frictionally engage said motion bar to prevent said motion bar from reciprocating and to lock said lever means substantially in place preventing movement of said drive means and said swash plate.

8. A brake system comprising in combination a rotating member, converting means mounted on said rotating member for converting said rotating motion of said rotating member to reciprocating motion, said converting means comprising a swash plate and an outer ring mounted on said swash plate, lever means connected to said outer ring, said lever means being moved by the reciprocating motion, piston means slidably mounted in a caliper and positioned adjacent said lever means, said piston means, comprising a plurality of pistons and including means to move said pistons to frictionally engage said lever meeans and hold said lever means in a fixed position to stop said rotating member from rotating.

9. A brake apparatus for a vehicle comprising a rotatable swash plate mounted to said vehicle, a support plate mounted to said vehicle, a plurality of connected levers, each of said levers being pivotally mounted on said support plate, one of said levers being connected to said swash plate to transmit movement of said swash plate to said plurality of levers, motion transfer means comprising a friction bar member moveably connected to another of said levers, said friction bar member being reciprocated by said swash plate through said plurality of levers, a caliper means mounted to said vehicle, said caliper having piston means positioned on opposite sides of said friction bar member and means connected to said piston means adapted to move said piston means to frictionally engage said friction bar member to prevent reciprocation of said friction bar member and stop said swash plate from rotating.

* * * * *